US012787146B2

(12) United States Patent
Jiang et al.

(10) Patent No.: US 12,787,146 B2
(45) Date of Patent: Nov. 3, 2026

(54) DEVICES AND METHODS FOR MANIPULATING BEAMS FROM AN ELECTRON CYCLOTRON RESONANCE ACCELERATOR

(71) Applicant: Omega-P R&D, Inc., New Haven, CT (US)

(72) Inventors: Yong Jiang, New Haven, CT (US); Jay L. Hirshfield, Orange, CT (US)

(73) Assignee: Omega-P R&D, Inc., New Haven, CT (US)

( * ) Notice: Subject to any disclaimer, the term of this patent is extended or adjusted under 35 U.S.C. 154(b) by 220 days.

(21) Appl. No.: 18/428,788

(22) Filed: Jan. 31, 2024

(65) Prior Publication Data

US 2024/0260166 A1 Aug. 1, 2024

Related U.S. Application Data

(60) Provisional application No. 63/482,386, filed on Jan. 31, 2023.

(51) Int. Cl.

| | |
|---|---|
| ***H05H 7/04*** | (2006.01) |
| ***G21K 5/00*** | (2006.01) |
| ***H05H 7/02*** | (2006.01) |
| ***H05H 13/00*** | (2006.01) |

(52) U.S. Cl.

CPC ................ *H05H 7/04* (2013.01); *H05H 7/02* (2013.01); *H05H 13/005* (2013.01); *G21K 5/00* (2013.01); *H05H 2007/025* (2013.01)

(58) Field of Classification Search

CPC .. G21K 5/00; H05H 13/005; H05H 2007/025; H05H 7/02; H05H 7/04; H05H 9/048; H05H 13/02; H05H 13/04; H05H 13/10

See application file for complete search history.

(56) References Cited

U.S. PATENT DOCUMENTS

| | | | | |
|---|---|---|---|---|
| 7,943,913 | B2 * | 5/2011 | Balakin .................. | H05H 13/04 250/424 |
| 9,823,572 | B2 * | 11/2017 | Nikipelov ............. | G01J 1/0407 |
| 9,854,662 | B2 * | 12/2017 | Mishin .................... | H05H 9/047 |
| 10,212,800 | B2 * | 2/2019 | Agustsson ........... | A61N 5/1045 |
| 10,609,806 | B2 * | 3/2020 | Roecken .............. | A61N 5/1043 |
| 11,612,049 | B2 * | 3/2023 | Agustsson ............... | H05H 7/18 |

(Continued)

*Primary Examiner* — David J Makiya

*Assistant Examiner* — Soorena Kefayati

(74) *Attorney, Agent, or Firm* — ArentFox Schiff LLP

(57) ABSTRACT

Apparatuses and methods for accelerating electrons include an electron source configured to provide a beam of electrons and an accelerator that utilizes electron cyclotron resonance acceleration (eCRA). The accelerator includes a radio frequency (RF) cavity having a longitudinal axis, one or more inlets, and one or more outlets and a first electro-magnet substantially surrounding at least a portion of the cavity and configured to produce an axial magnetic field. The RF cavity is coupled to an RF source and configured to accelerate the beam of electrons axially entering the RF cavity with non-linear cyclotron resonance acceleration. A second electro-magnet located downstream of the one or more outlets of the RF cavity is configured to generate an inverse cusp in the axial magnetic field to manipulate the beam of electrons leaving the RF cavity from a helical orbit to a substantially linear path.

20 Claims, 11 Drawing Sheets

(56) References Cited

U.S. PATENT DOCUMENTS

| | | | | |
|---|---|---|---|---|
| 2010/0327785 | A1* | 12/2010 | Crewson | H05H 7/04 335/297 |
| 2013/0307438 | A1* | 11/2013 | Morehouse | H05H 1/18 315/502 |
| 2014/0270086 | A1* | 9/2014 | Krasnykh | H05G 2/00 378/124 |
| 2015/0043719 | A1* | 2/2015 | Dondokovich Dugar-Zhabon | H05H 13/005 315/502 |
| 2015/0359080 | A1* | 12/2015 | Dolgashev | H05H 7/02 315/505 |
| 2016/0147161 | A1* | 5/2016 | Nikipelov | G01J 1/0407 355/67 |
| 2017/0265293 | A1* | 9/2017 | Mishin | H05H 7/02 |
| 2017/0330739 | A1* | 11/2017 | Hosaka | H01J 49/0018 |
| 2018/0132342 | A1* | 5/2018 | Abs | H05H 7/02 |
| 2018/0279461 | A1* | 9/2018 | Agustsson | H05H 9/04 |
| 2018/0317310 | A1* | 11/2018 | Xiao | H05H 7/001 |
| 2019/0379886 | A1* | 12/2019 | Lee | H05H 13/005 |
| 2020/0035438 | A1* | 1/2020 | Star-Lack | H01J 35/112 |
| 2022/0130635 | A1* | 4/2022 | Shigeoka | H05H 7/18 |
| 2022/0175981 | A1* | 6/2022 | Kroc | A61L 2/082 |
| 2023/0413415 | A1* | 12/2023 | Burt | H05H 7/02 |

* cited by examiner

DEVICES AND METHODS FOR MANIPULATING BEAMS FROM AN ELECTRON CYCLOTRON RESONANCE ACCELERATOR

CROSS-REFERENCE TO RELATED APPLICATION

The present application claims benefit of U.S. Provisional Application No. 63/482,386 entitled "MANIPULATING BEAMS FROM AN ELECTRON CYCLOTRON RESONANCE ACCELERATOR" filed Jan. 31, 2023, and is assigned to the assignee hereof and hereby expressly incorporated by reference herein.

STATEMENT REGARDING GOVERNMENT SUPPORT

The Government has rights in this invention pursuant to a USER Agreement dated Oct. 6, 2022 between Particle Accelerated Research Foundation (PARF) and BROOKHAVEN SCIENCE ASSOCIATES, LLC, which manages and operates Brookhaven National Laboratory for the US Department of Energy under Contract No. DE-SC0012704.

TECHNICAL FIELD

Aspects of the present disclosure generally relate to apparatuses and methods for accelerating electrons.

BACKGROUND

Energetic charged particles have many usage applications in the fields of medicine, nuclear energy, testing, experimental research, national security, etc. Examples of energetic charged particles include ions, protons, electrons, and positrons. Conventional equipment used in producing energetic charged particles may require high investment cost and large facilities or real estate, while limiting the mobility of the equipment. Therefore, there continue to be unmet needs for improvements in the production of energetic charged particles.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In some aspects, the techniques described herein relate to a device, including: an electron source configured to provide a beam of electrons; and an accelerator including: a radio frequency (RF) cavity having a longitudinal axis, one or more inlets, and one or more outlets; a first electro-magnet substantially surrounding at least a portion of the RF cavity and configured to produce an axial magnetic field, wherein the RF cavity is coupled to an RF source and configured to accelerate the beam of electrons axially entering the RF cavity with non-linear cyclotron resonance acceleration; and a second electro-magnet located downstream of the one or more outlets of the RF cavity and configured to generate an inverse cusp in the axial magnetic field.

In some aspects, the techniques described herein relate to a device, wherein a current in a second set of coils of the second electro-magnet is in an opposite direction of a first set of coils of the first electro-magnet.

In some aspects, the techniques described herein relate to a device, wherein the inverse cusp provides a transverse impulse to the beam of electrons that transforms transverse momentum of the electrons into axial momentum.

In some aspects, the techniques described herein relate to a device, wherein the beam of electrons exiting the second electro-magnet is an annular beam of linearly-directed electrons.

In some aspects, the techniques described herein relate to a device, further including a target located downstream from the second electro-magnet.

In some aspects, the techniques described herein relate to a device, wherein the target is a heavy metal configured to absorb the beam of electrons and generate a forward-directed beam of energetic x-rays.

In some aspects, the techniques described herein relate to a device, wherein the target is a window that separates a vacuum of the RF cavity from an atmosphere.

In some aspects, the techniques described herein relate to a method, including: receiving, at an RF cavity within a first axial magnetic field, a beam of electrons via one or more inlets; applying a radio frequency (RF) wave to the RF cavity, wherein the RF wave is configured to accelerate the beam of electrons axially entering the RF cavity with non-linear cyclotron resonance acceleration; emitting the accelerated beam of electrons from the RF cavity via one or more outlets; and manipulating the beam of electrons leaving the RF cavity from a helical orbit to a linear path with a second axial magnetic field.

In some aspects, the techniques described herein relate to a method, wherein manipulating the beam of electrons leaving the RF cavity includes applying a current in a second set of coils of a second electro-magnet in an opposite direction of a first set of coils of a first electro-magnet that generates the first axial magnetic field.

In some aspects, the techniques described herein relate to a method, wherein the beam of electrons exiting the second electro-magnet is an annular beam of linearly-directed electrons.

In some aspects, the techniques described herein relate to a method, wherein manipulating the beam of electrons leaving the RF cavity includes generating an inverse magnetic cusp with the second axial magnetic field, wherein the inverse magnetic cusp provides a transverse impulse to the beam of electrons that transforms transverse momentum of the electrons into axial momentum.

In some aspects, the techniques described herein relate to a method, further including directing the beam of electrons toward a target.

In some aspects, the techniques described herein relate to a method, wherein the target is a heavy metal configured to absorb the beam of electrons and generate a forward-directed beam of energetic x-rays.

In some aspects, the techniques described herein relate to a method, wherein the x-rays are directed to one of: a medical device, food, or insect to be sterilized; an electronic or industrial weld or nuclear material to be inspected; or a well to be measured.

In some aspects, the techniques described herein relate to a method, further including directing the accelerated beam of electrons toward a waste stream to be irradiated.

In some aspects, the techniques described herein relate to a device, including: an electron source configured to provide a beam of electrons; and an accelerator including: a radio frequency (RF) cavity having a longitudinal axis, one or more inlets, and one or more outlets; an electro-magnet substantially surrounding at least a portion of the RF cavity and configured to produce an axial magnetic field; at least one pair of waveguides coupling the RF cavity to an RF source configured to generate an RF wave, wherein the RF wave is a superposition of two orthogonal TE111 transverse electric modes excited in quadrature to produce an azimuthally rotating standing-wave mode configured to accelerate the beam of electrons axially entering the RF cavity with non-linear cyclotron resonance acceleration; and means for manipulating the beam of electrons leaving the RF cavity from a helical orbit to an axial linear path.

In some aspects, the techniques described herein relate to a device, wherein the means for manipulating the beam of electrons from a helical orbit to a linear path includes a second electro-magnet positioned to generate an inverse magnetic cusp that provides a transverse impulse to beam electrons.

In some aspects, the techniques described herein relate to a device, wherein the means for manipulating the beam of electrons includes a target.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The features of various aspects of the disclosure are set forth in the appended claims. In the description that follows, like parts are marked throughout the specification and drawings with the same or similar numerals, respectively. The drawing figures are not necessarily drawn to scale, and certain figures may be shown in exaggerated or generalized form in the interest of clarity and/or conciseness. The disclosure itself, however, as well as a preferred mode of use, further advantages thereof, will be best understood by reference to the following detailed description of illustrative aspects of the disclosure when read in conjunction with the accompanying drawings.

DETAILED DESCRIPTION

Figure 1:
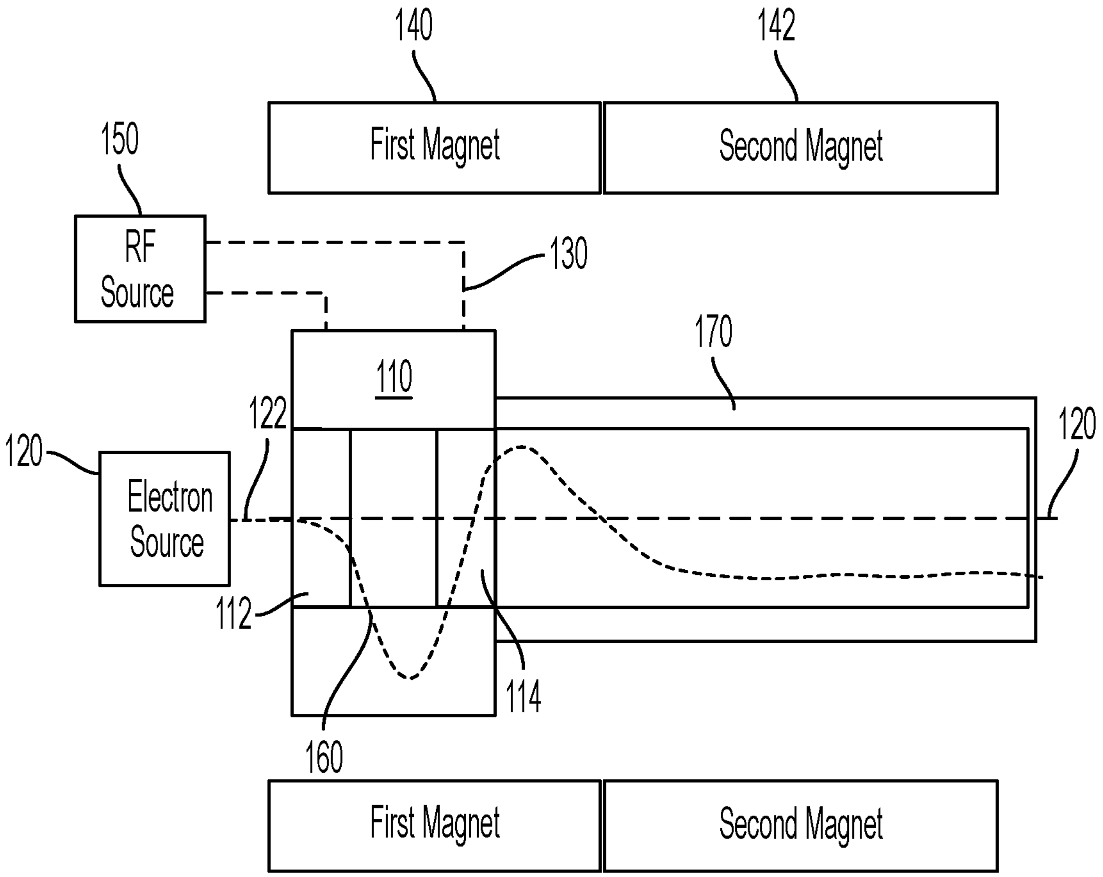
FIG. 1 is a schematic diagram illustrating some components of an electron cyclotron resonance acceleration (eCRA) system, in accordance with aspects of the present disclosure.

The following includes definitions of selected terms employed herein. The definitions include various examples and/or forms of components that fall within the scope of a term and that may be used for implementation. The examples in the description are not intended to be limiting.

Development of compact, efficient, low-cost, high-power electron accelerators is needed for scientific, national security, industrial, and commercial applications. Typically, these accelerators produce beams with average powers up to 100 kW although above, and particle energies of up to 10 MeV—a limit that is often imposed to minimize activation, neutron production, and shielding mass. In an aspect, it may be desirable for applications with greater power. Applications for MW-level beam powers exist for remediation of polluted wastewater streams, flue gas and other effluents; neutralization of toxic solid wastes; and numerous industrial processes. Lower power applications are in bremsstrahlung ("braking radiation") sources for sterilization of medical instruments and supplies, foodstuffs, and photonuclear reactions to produce radioisotopes, and for production of intense THz radiation.

One candidate for an industrial accelerator designed to meet these needs for some of these applications is electron cyclotron resonance acceleration (eCRA), described in International Application No. PCT/US/22/40457, which is assigned to the assignee hereof and incorporated herein by reference. The eCRA provides for an alternate concept for cyclotron resonance acceleration of electrons that employs a cavity (e.g., a cylindrical cavity) operating under conditions that do not conform to auto-resonance. Accordingly, performance of an accelerator according to this alternate concept can exceed limits imposed by the auto-resonance condition. The radio frequency (RF) fields of the cavity are a superposition of two orthogonal modes excited in quadrature to provide a rotating standing-wave mode. The detailed numerical solutions of the highly non-linear equations that govern motion for electrons injected into a $TE_{111}$-mode cavity immersed in a strong axial magnetic field show power beyond the intrinsic limit of previous accelerators. These higher energy limits arise when slippage in phase between the particle's momentum and the RF electric field moves from accelerating into decelerating ranges, or by particle interception on the cavity wall. The slippage in phase favors energy transfer to the electrons and avoids energy transfer back to the RF wave.

Generally, an eCRA system includes an electron source configured to provide a beam of electrons and an accelerator. The accelerator includes an RF cavity having a longitudinal axis, one or more inlets, and one or more outlets. The accelerator includes an electro-magnet substantially surrounding at least a portion of the cavity and configured to produce an axial magnetic field. The accelerator includes at least one pair of waveguides coupling the RF cavity to an RF source configured to generate a RF wave. The RF wave is a superposition of two orthogonal $TE_{111}$ transverse electric modes excited in quadrature to produce an azimuthally rotating standing-wave mode configured to accelerate the beam of electrons axially entering the cavity with non-linear cyclotron resonance acceleration.

The eCRA system described in International Application No. PCT/US/22/40457 generates a beam in which electrons emerge from the cavity at different radii and different azimuthal angles. That is, the beam of electrons exiting the cavity traces a circular helical pattern around respective axes when the magnetic field is constant. The imprint of such a beam on a fixed target normal to the axis is an accumulation of loci where particles in a continuous stream moving on offset helical orbits intersect the target. This superposition is centered on the axis. In some applications, other beam shapes and properties may be desirable.

In an aspect, the present disclosure provides an extension to an eCRA device that uses variations in the magnetic field to manipulate the beam of electrons emitted from the RF cavity. In particular, the axial magnetic field includes an inverse cusp that manipulates the beam of electrons leaving the RF cavity from a helical orbit to a substantially linear path. The eCRA device may include an electron source configured to provide a beam of electrons; and an accelerator. The accelerator includes a RF cavity having a longitudinal axis, one or more inlets, and one or more outlets. A first electro-magnet substantially surrounds at least a portion of the RF cavity and is configured to produce an axial magnetic field. The RF cavity is coupled to an RF source and configured to accelerate the beam of electrons axially entering the RF cavity with non-linear cyclotron resonance acceleration. A second electro-magnet located downstream of the one or more outlets of the RF cavity is configured to generate an inverse cusp in the axial magnetic field. The inverse cusp manipulates the beam of electrons leaving the RF cavity from a helical orbit to a substantially linear path.

Turning to FIG. 1, schematic diagram illustrates some components of an eCRA system 100. The system 100 includes an RF cavity 110. For example, the RF cavity 110 may be a cylindrical cavity having a radius R and length L. The RF cavity 110 may have a longitudinal axis 116. In various implementations, the longitudinal axis 116 may be oriented vertically or horizontally. The RF cavity 110 includes one or more inlets 112 and one or more outlets 114. The direction along the longitudinal axis 116 from the inlet 112 to the outlet 114 may be referred to as the downstream direction. In some implementations, the RF cavity 110 is made of copper. In some implementations, the eCRA system 100 operates at room temperature. As used herein, "room temperature" refers to temperatures that do not cause the RF cavity 110 to be super-conductive. In some implementations, for example, the RF cavity 110 may be cooled by water or another suitable fluid. For instance, the RF cavity 110 may be cooled to within 0°-100° C., or preferably 20°-80° C. For example, in some implementations, the RF cavity 110 may include channels for cooling with a suitable fluid (e.g., water, forced air, or forced Helium gas).

The system 100 includes an electron source 120 configured to provide a beam of electrons 122. The electron source 120 is aligned with the inlet 112 to axially inject the beam of electrons 122 into the cavity 110. For example, the electron source 120 may be an electron gun or electron emitter.

The system 100 includes an RF source 150 coupled to the RF cavity 110. For example, at least one pair of waveguides 130 may couple the cavity 110 to the RF source 150. In some implementations, the waveguides 130 of a pair are oriented at a 90° angle to each other. For example, one waveguide 130 is illustrated with the other waveguide 130 of the pair being oriented into or out of the page. In some implementations, two pairs of waveguides are equally spaced at 90° angles around the cavity 110. Accordingly, each pair of waveguides is spatially orthogonal. The waveguides are excited in quadrature. That is, each waveguide 130 carries an RF wave that is orthogonal in phase (i.e., separated by 90°) to the RF wave of the paired waveguide 130. Each RF wave is a $TE_{111}$ transverse electric mode. The subscript (111) indicates that all electric components of the field are in a plane transverse to the axial direction. Further, within the cavity 110, the wave is an azimuthally rotating standing wave. That is, the nodes are fixed at the end walls of the cavity 110, but the wave rotates azimuthally about the longitudinal axis 116.

The system 100 includes a first magnet 140 that substantially surrounds at least a portion of the cavity 110. In some implementations, due to the presence of the waveguides the magnet 140 may include two or more coils (e.g., on each side of the waveguides). The first magnet 140 may be a superconducting electro-magnet, an electro-magnet, a permanent magnet, and/or an electro-permanent magnet. The magnet 140 may include structures such as plates or bars to shape a magnetic field. The magnet 140 may be cooled to a critical temperature, or below, as needed for use and/or operation of any superconducting materials inside the magnet 140. The magnet 140 may include materials such as niobium titanium, niobium tin, vanadium gallium, magnesium diboride, bismuth strontium calcium copper oxide, yttrium barium copper oxide, and/or other suitable materials. In some implementations, the magnetic field strength of the magnet 140 may be 0.7 Tesla or less, where room temperature coils may operate. In other applications magnets with 1 Tesla, 2 Tesla, 5 Tesla, 7 Tesla, 10 Tesla, or other suitable field strength may be utilized. In some implementations, the magnet 140, or additional magnets may extend past the cavity 110 and control the accelerated electrons. In an aspect, the beam of electrons 122 enters the cavity 110 and the electrons are accelerated with non-linear cyclotron resonance acceleration. For example, the electrons may follow a path 160, which traces a circular helical pattern about a respective axis when the magnetic field is constant. It was found, depending on the RF-field strength (as characterized by $E_w$) and the magnitude of the guide magnetic field $B_o$, that electrons are accelerated, but can either reach and are transmitted through the end wall of the cavity, or can be reflected back. The walls of the idealized cavity are taken to be transparent to electrons.

In an aspect, the system 100 includes a second magnet 142 that substantially surrounds at least a portion of a beam channel 170. In some implementations, the first magnet 140 extends past the RF cavity 110 to surround a portion of the beam channel 170. The beam channel 170 may be a hollow cylindrical member. In an aspect, the RF field does not extend into the beam channel 170. The second magnet 142 provides a second magnetic field that interacts with the magnetic field of the first magnet 140 to manipulate the beam of electrons leaving the RF cavity from a helical orbit to an axial linear path. For example, the second magnet 142 may generate an inverse magnetic cusp that provides a transverse impulse to beam electrons. Accordingly, the transverse momentum of the electrons is transformed to axial momentum, resulting in a substantially axial linear path.

Figure 2:
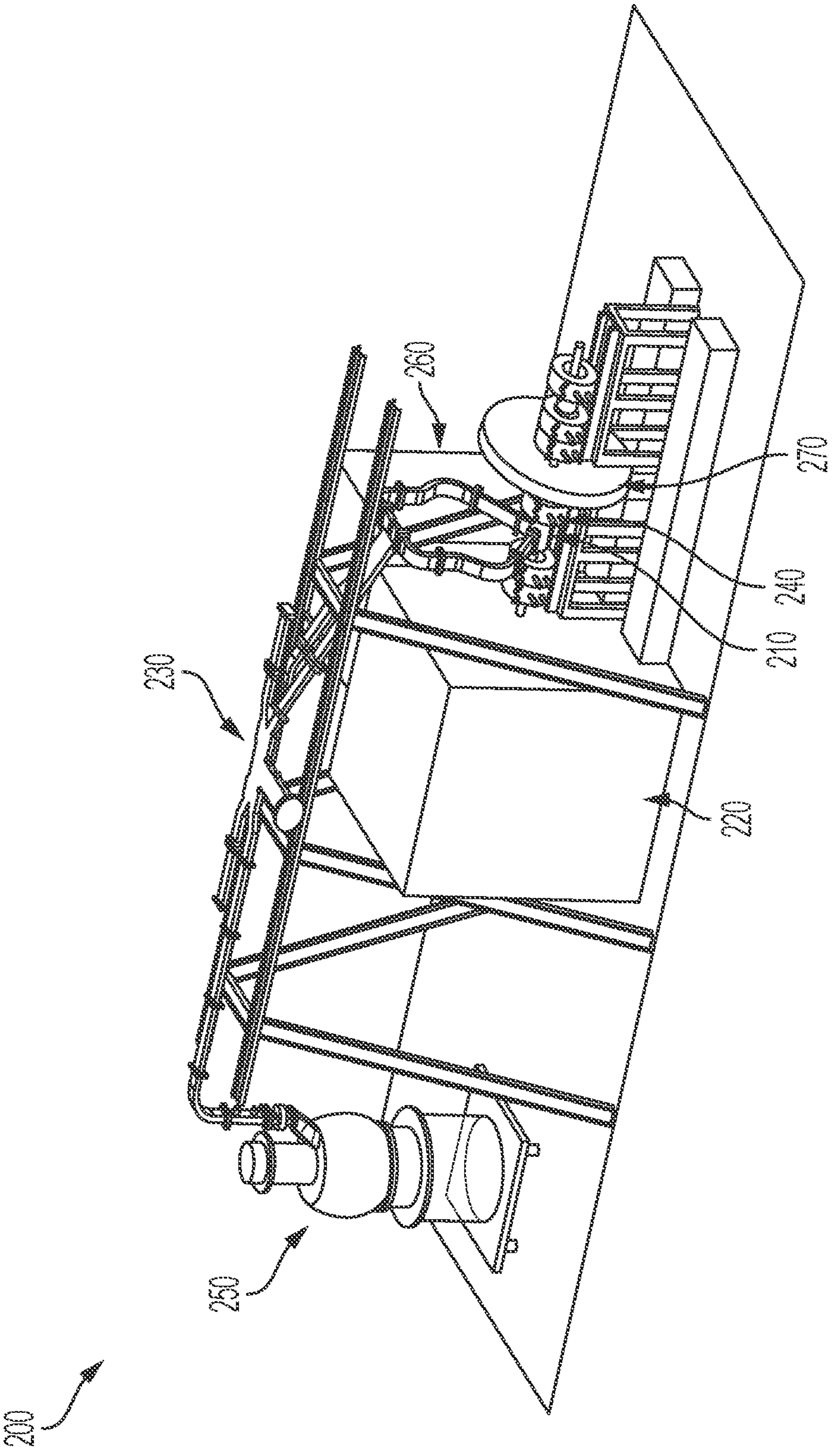
FIG. 2 is a diagram of another example eCRA system, in accordance with aspects of the present disclosure.

FIG. 2 is a diagram of another example eCRA system 200. The eCRA system 200 includes an electron source 220, an RF cavity 210, a waveguide circuit 230, magnets 240, an RF source 250, and a modulator 260. In an implementation, the RF components are S-band components (e.g., 2.856 GHz). For example, the RF source 250 may be a klystron such as an XK-5 klystron. The waveguide circuit 230 may be a WR-248 waveguide circuit including directional couplers, a variable power device and a 3-dB hybrid. The 3-dB hybrid may split the power equally with a 90° phase difference into the waveguides 130 that drive the RF cavity 210. The electron source 220 may be an e-gun tank controlled by the modulator 260.

In an example, the eCRA system 200 is oriented horizontally. A target section 270 located after the cavity 210 may produce x-rays. For example, the target section 270 may include a target such as a heavy metal that produces x-rays when the accelerated electron beam impinges on the target. The x-rays may be further directed toward a medical device, food, or insect to be sterilized; an electronic or industrial weld or nuclear material to be inspected; or a well to be measured. The target section 270 may include additional magnets to control the accelerated beam.

Figure 3:
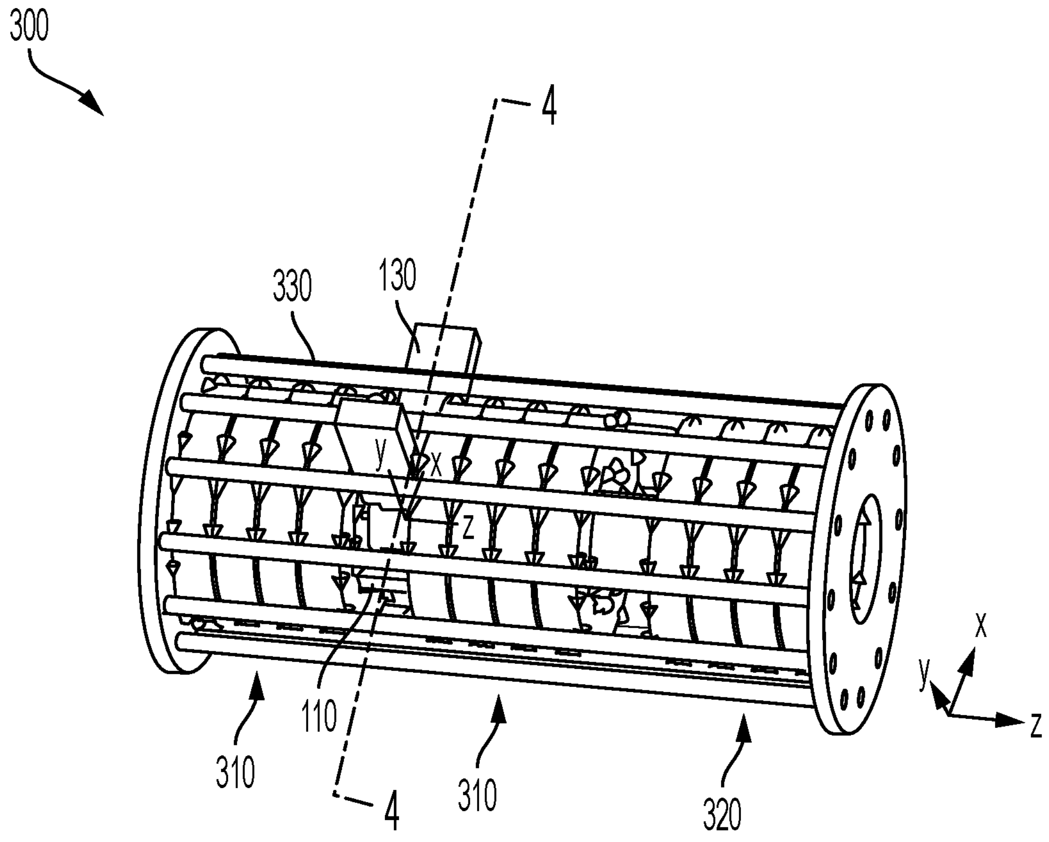
FIG. 3 is a perspective view of an example arrangement of electro-magnets for generating first and second magnetic fields, in accordance with aspects of the present disclosure.

FIG. 3 is a perspective view of an example arrangement 300 of electro-magnets for generating first and second magnetic fields. For example, a first electro-magnet 310 may include coils surrounding the RF cavity 110. The first electro-magnet 310 may include iron structures such as bars or plates that may be placed to shape the magnetic field. In some implementations, the coils of the first electro-magnet 310 may include a set of coils on each side of the waveguides 130. A current may be applied to the coils of the first electro-magnet 310 in a first direction to generate a first axial magnetic field. A second electro-magnet 320 may be located downstream from an outlet of the RF cavity 110. The second electro-magnet 320 may include coils surrounding a path of the electrons exiting the RF cavity 110. Like the first electro-magnet 310, the second electro-magnet 320 may include iron structures such as bars or plates to shape the magnetic field. The arrangement 300 may include a shield 330 formed of metal bars and/or plates that provides physical support for the first electro-magnet 310 and the second electro-magnet 320. The shield 330 may also restrict the magnetic field external to the shield 330, for example, to protect other equipment.

In an aspect, the current in the coils of the second electro-magnet 320 is in an opposite direction of a first set of coils of the first electro-magnet 310. As described in further detail below, the reversed current generates a second magnetic field in an opposite direction. The interaction of the first magnetic field and the second magnetic field produces an inverse cusp, which provides a transverse impulse to the beam of electrons that transforms transverse momentum of the electrons into axial momentum.

Figure 4:
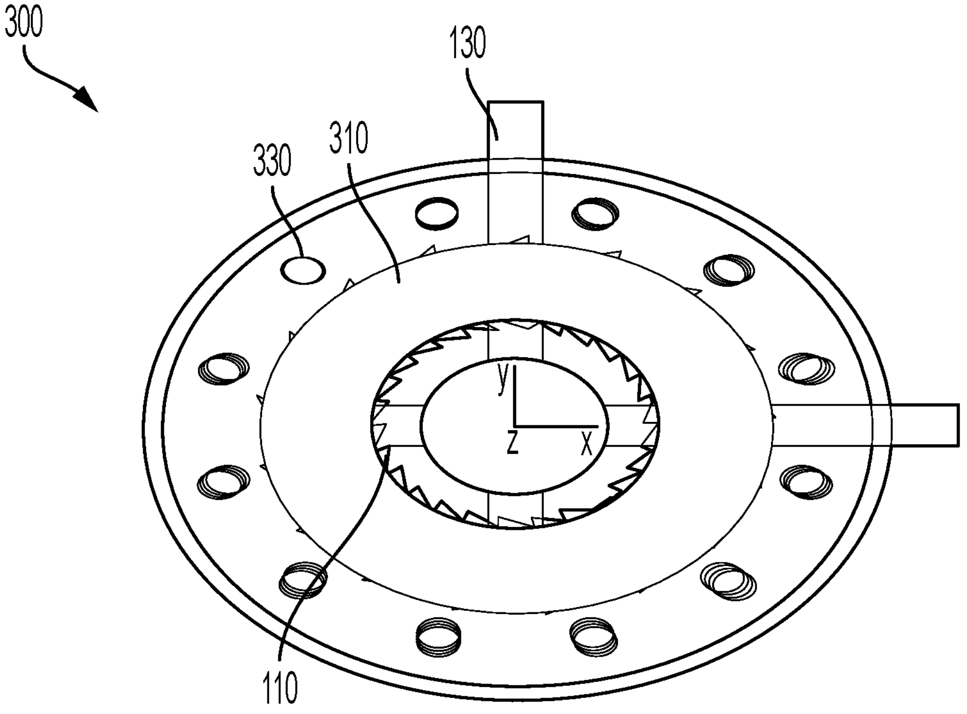
FIG. 4 is a cross-sectional view of FIG. 3, in accordance with aspects of the present disclosure.

FIG. 4 is a cross-sectional view of the example arrangement 300 of electro-magnets of FIG. 3. As illustrated, the coils of the first electro-magnet 310 surround the RF cavity 110. Similarly, the coils of the second electro-magnet 320 surround the beam channel 170. In some implementations, the RF cavity 110 includes grooves or channels to improve cooling. The shield 330 may include a plurality of axial bars around the first electro-magnet 310 and the second electro-magnet 320. The bars may be joined by annular plates upstream and downstream from the RF cavity and beam channel 170.

Figure 5A:
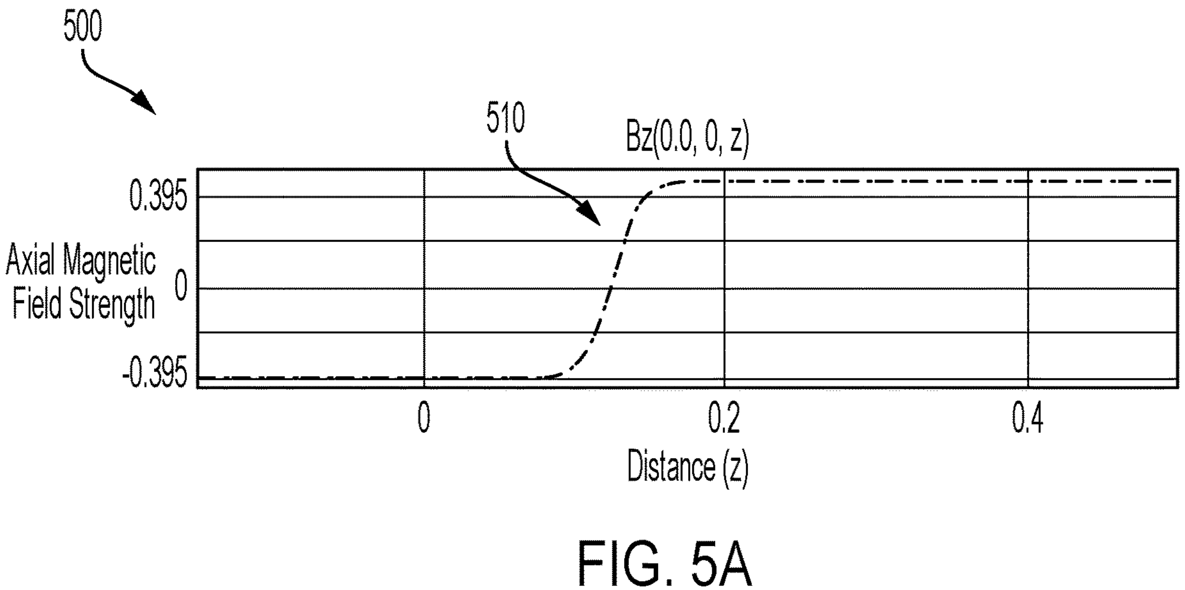
FIGS. 5A and 5B illustrate an example of a magnetic field for manipulating a beam of electrons from an eCRA system, in accordance with aspects of the present disclosure.
Figure 5B:
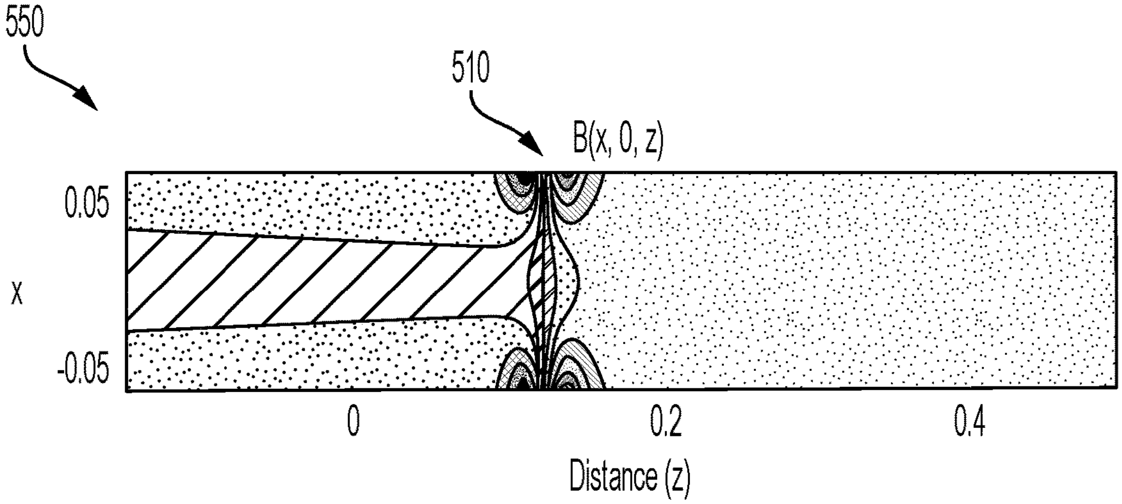

FIGS. 5A and 5B illustrate an example of a magnetic field for manipulating a beam of electrons from an eCRA system. FIG. 5A is a chart 500 of axial magnetic field strength. The axial magnetic field strength reverses at an inverse cusp 510. That is, the first magnetic field generated by the first electro-magnet 310 interacts with the second magnetic field generated by the second electro-magnet 320 to cause the direction of the magnetic field to change direction and thus comprise the inverse cusp 510. An inverse cusp is a combination of two oppositely-directed magnetic fields used to exchange transverse charged particle momentum into longitudinal momentum. In contrast, a conventional cusp is used to exchange longitudinal charged particle momentum into transverse momentum.

FIG. 5B is a field-strength map 550 showing transverse magnetic field in an x-z plane (e.g., a longitudinal cross section). A denser hatch-pattern indicates a greater field strength. At the inverse cusp 510 the transverse magnetic field is greatest towards the edges of the beam channel 170. The transverse magnetic field provides a transverse impulse to the beam of electrons. Transverse momentum of the electrons is transformed into axial momentum.

Figure 6A:
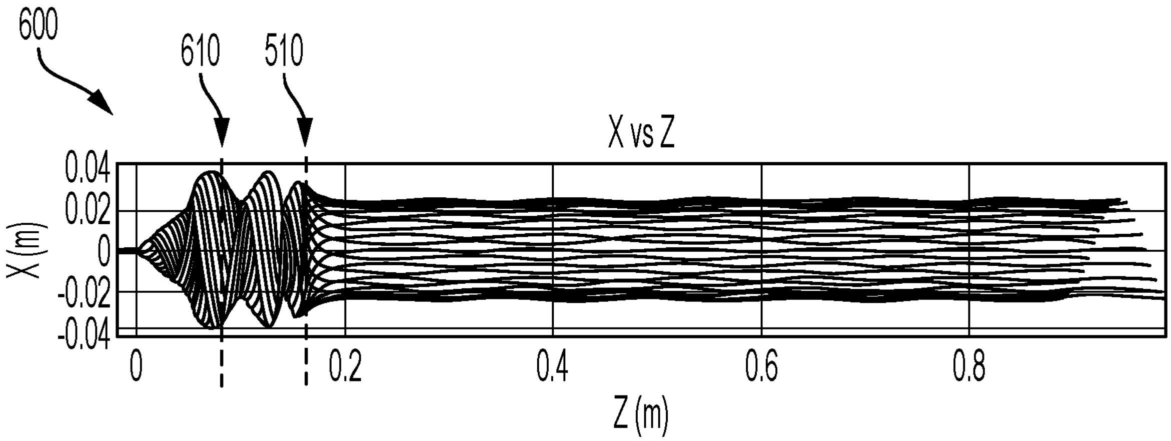
FIGS. 6A, 6B, 6C, and 6D illustrate examples of electron paths in an eCRA system, in accordance with aspects of the present disclosure.

FIGS. 6A, 6B, 6C, and 6D illustrate examples of electron paths in an eCRA system. FIG. 6A is a chart 600 of example electron orbits in the x-z plane. As the electrons enter the RF cavity 110 at distance of 0, the RF field causes non-linear cyclotron resonance acceleration. That is, the electrons follow a helical path within the RF cavity 110 and exit the RF cavity at distance 610. The inverse cusp 510 is located downstream from the outlet 114 of the RF cavity 110. The strong transverse magnetic field at the inverse cusp 510 transforms the transverse momentum of the electrons to axial momentum. Accordingly, the electrons follow respective substantially linear paths through the beam channel 170. In some aspects, the manipulated beam can follow only a nearly linear path or curved path before impacting on a target, for example, if the target is immersed inside the magnetic field of the second electro-magnet 320. A substantially linear path may refer to a path having a pitch angle of less than 10°. In some implementations, it may be more preferable to minimize a pitch angle to approximate a linear path. For instance, a pitch angle of less than 8° may be preferable, or more preferably a pitch angle of less than 5°, depending on the application.

Figure 6B:
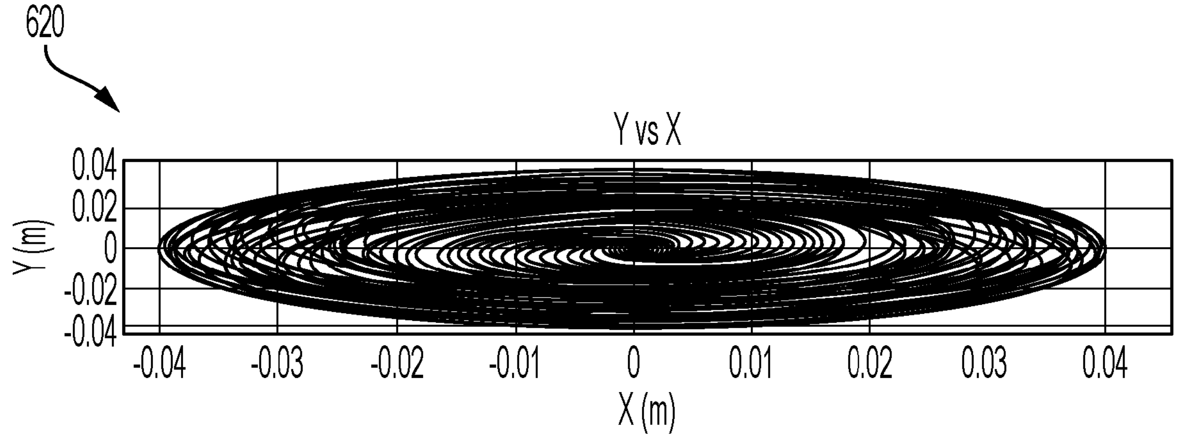

FIG. 6B is a chart 620 of example electron orbits in the x-z plane. Generally, each electron spirals outward following a helical orbit around a different axis depending on the time within the RF cycle that the electron entered the RF cavity 110.

Figure 6C:
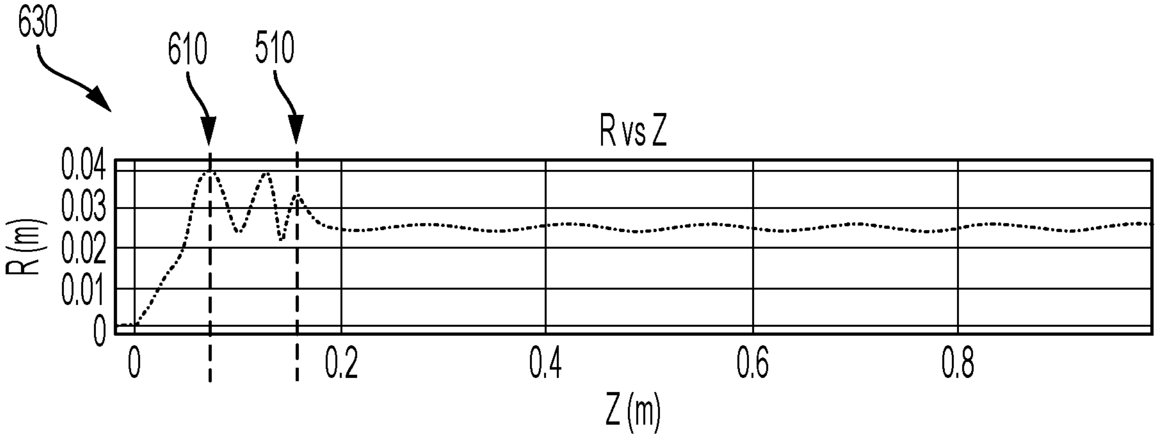

FIG. 6C is a chart 630 of the radius of electron orbits. The radius increases as the electrons spiral outward upon entering the RF cavity 110. After exiting the RF cavity 110 at distance 610, the radius varies due to the orbit around the respective axis. The transverse magnetic field at the cusp 510 transforms most of the transverse momentum into linear axial momentum resulting in a more linear path.

Figure 6D:
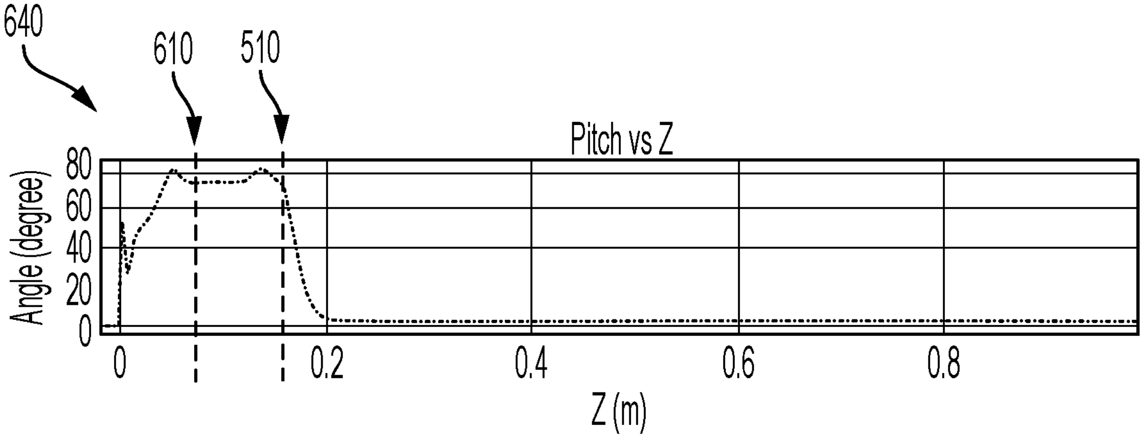

FIG. 6D is a chart 640 of pitch of the electron orbits. The electrons experience a strong initial transverse kick upon entering the RF cavity 110 resulting in the initial spike in pitch. After the initial spike, the RF field increases the pitch within the RF cavity 110. Upon exiting the RF cavity 110, the electrons maintain the same pitch until reaching the inverse cusp 510. The transverse magnetic field at the inverse cusp 510 directs the electrons linearly, thereby greatly reducing the pitch of the helical orbit. For example, the pitch angle may be less than 10° when exiting the second electro-magnet 320.

Figure 7:
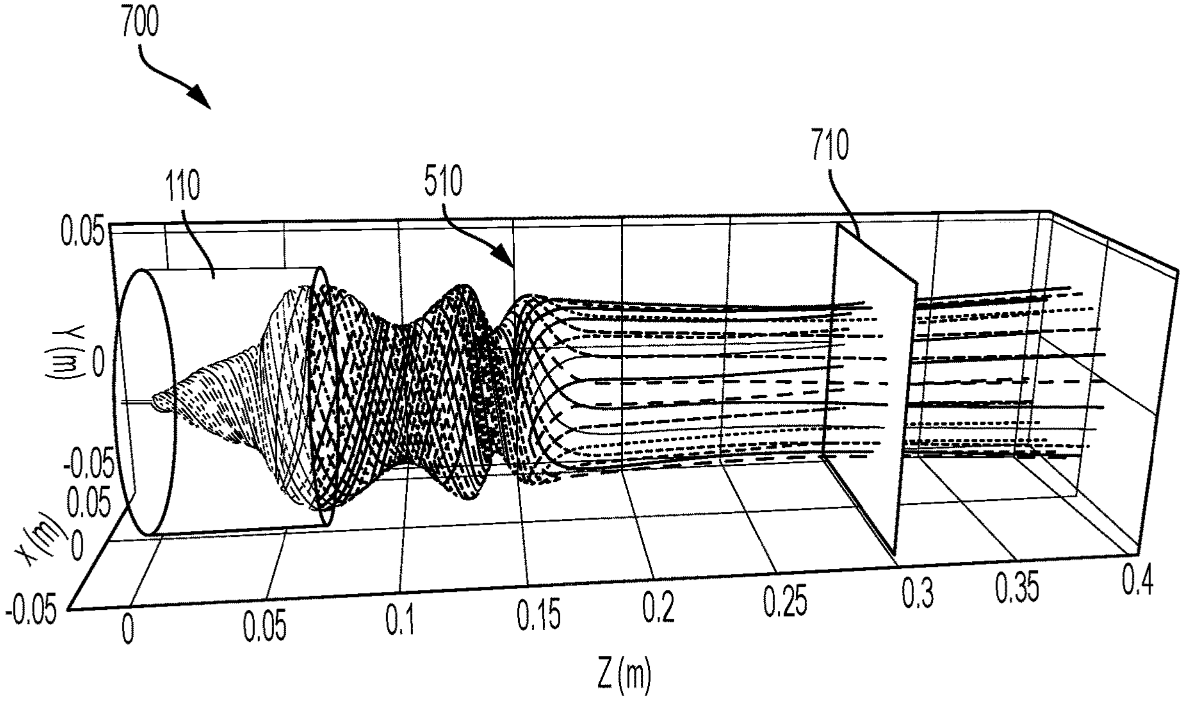
FIG. 7 is a diagram of examples of electron paths in an eCRA system forming an annular beam, in accordance with aspects of the present disclosure.

FIG. 7 is a diagram of examples of electron paths in an eCRA system forming an annular beam that impinges a target 710. The target 710 may be a window that separates an eCRA vacuum from an atmosphere where the beam electrons can interact. For example, the electrons may irradiate pollutants. As another example, the target 710 may be a heavy metal such as tungsten (W) or Tantalum (Ta) that absorbs the beam electrons. Via the Bremsstrahlung process, the heavy metal generates a forward-directed beam of energetic x-rays. The x-rays may be used, for example, for sterilization of food-stuffs or medical supplies. In some aspects, the generated x-rays may be focused towards a tight spot. Alternatively, the x-rays may diverge like a finite area source as the results of beam manipulation. The shape and direction of the x-rays may be modified to meet application requirements by adjusting the strength and position of the second magnetic field as well as the position of the target 710 with respect to the second magnetic field.

Figure 8:
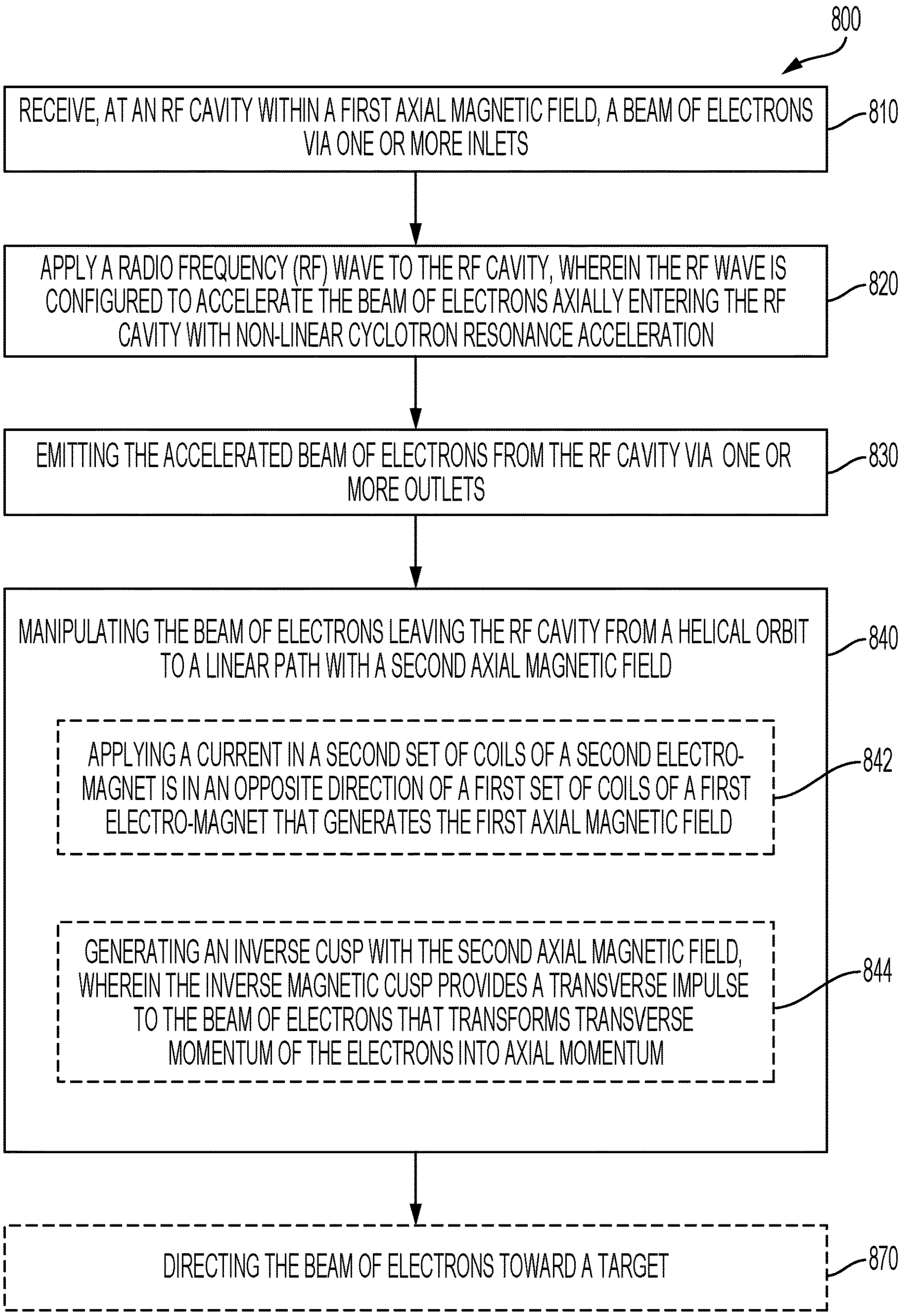
FIG. 8 is a flowchart of an example method for accelerating electrons, in accordance with aspects of the present disclosure.

Turning now to FIG. 8, a flowchart of an example method 800 for accelerating electrons may be performed by the eCRA system 100 (FIG. 1), the eCRA system 200 (FIG. 2), or the eCRA system 1000 (FIG. 10), for example.

At block 810, the method 800 may include receiving, at an RF cavity within a first axial magnetic field, a beam of electrons via one or more inlets. For example, the cavity 110 may receive the plurality of electrons via one or more inlets (e.g., inlet 112). For instance, the electron source 120 may provide a beam of electrons.

At block 820, the method 800 may include applying a RF wave to the RF cavity, wherein the RF wave is configured to accelerate the beam of electrons axially entering the RF cavity with non-linear cyclotron resonance acceleration. For example, an RF source (e.g., RF source 150) may apply an RF wave to the cavity 110 or 210 via the waveguides 130. In some implementations, the RF wave is a superposition of two $TE_{111}$ orthogonal transverse electric modes excited in quadrature to produce a rotating standing-wave mode. The rotating standing wave mode may accelerate the beam of electrons axially entering the cavity 110 or 210 with non-linear cyclotron resonance acceleration (e.g., according to path 160).

At block 830, the method 800 may include emitting the plurality of accelerated electrons from the RF cavity via one or more outlets. For example, the cavity 110, 210 may emit the plurality of accelerated electrons via one or more outlets (e.g., outlet 114).

At block 840, the method 800 may include manipulating the beam of electrons leaving the RF cavity from a helical orbit to a linear path with a second axial magnetic field. For example, the second magnet 142 or the second electro-magnet 320 may manipulate the beam of electrons leaving the RF cavity from a helical orbit to a linear path with a second axial magnetic field. In some implementations, at sub-block 842, the block 840 may optionally include applying a current in a second set of coils of a second electro-magnet 320 in an opposite direction of a first set of coils of a first electro-magnet 310 that generates the first axial magnetic field. In some implementations, at sub-block 842, the block 840 may optionally include generating an inverse cusp with the second axial magnetic field, wherein the inverse magnetic cusp provides a transverse impulse to the beam of electrons that transforms transverse momentum of the electrons into axial momentum.

At block 850, the method 800 may optionally include directing the plurality of accelerated electrons toward a target. For example, the second magnet 142 or second electro-magnet 320 may direct the beam of accelerated electrons toward the target 710. In some implementations, the accelerated beam of electrons impinges on the target to create x-rays. For example, the target may be a heavy metal. The x-rays may be directed toward one of: a medical device, food, or insect to be sterilized; an electronic or industrial weld or nuclear material to be inspected; or a well to be measured.

Referring back to FIG. 1, the eCRA system 100 may include a computer system configured to automatically control the generation of accelerated charged electrons and/or various other features of the system 100, such as those used for one or more accelerated beams of electrons, via communication couplings. The communication couplings may be wired and/or wireless couplings, including Wireless Fidelity (WiFi) links, Bluetooth links, General Purpose Interface Bus (GPIB) links, Parallel links, Serial links, Universal Serial Bus (USB) links, Peripheral Component Interconnect (PCI) link, or other suitable communication couplings.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

Figure 9:
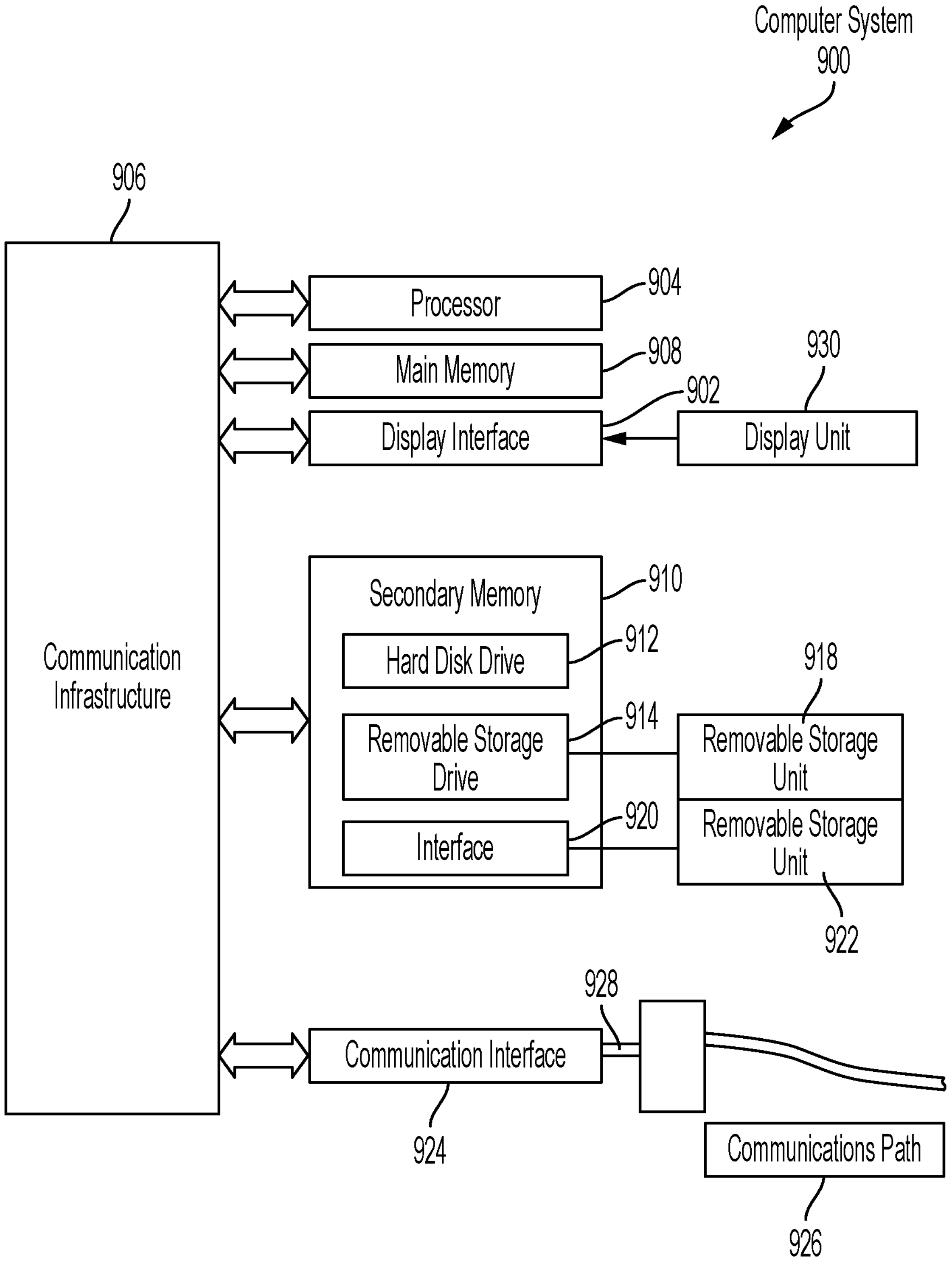
FIG. 9 illustrates an example of a computer system for controlling an eCRA system in accordance with aspects of the present disclosure.

In an aspect of the present disclosure, features are directed toward one or more computer systems capable of carrying out the functionality described herein. An example of such the computer system 900 is shown in FIG. 9. The computer system 900 may include one or more processors, such as the processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912, and/or a removable storage drive 914, representing a floppy disk drive, a magnetic tape drive, an optical disk drive, a universal serial bus (USB) flash drive, etc. The removable storage drive 914 reads from and/or writes to a removable storage unit 918 in a well-known manner. Removable storage unit 918 represents a floppy disk, magnetic tape, optical disk, USB flash drive etc., which is read by and written to removable storage drive 914. As will be appreciated, the removable storage unit 918 includes a computer usable storage medium having stored therein computer software and/or data.

Alternative aspects of the present disclosure may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, an RF link and/or other communications channels. In this document, the terms "computer program medium" and "computer usable medium" are used to refer generally to media such as a removable storage unit 918, a hard disk installed in hard disk drive 912, and signals 928. The term non-transitory computer-readable medium specifically excludes transitory signals. These computer program products provide software to the computer system 900. Aspects of the present disclosure are directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features in accordance with aspects of the present disclosure, as discussed herein. In particular, the computer programs, when executed, enable the processor 904 to perform the features in accordance with aspects of the present disclosure. Accordingly, such computer programs represent controllers of the computer system 900.

In an aspect of the present disclosure where the method is implemented using software, the software may be stored in a computer program product and loaded into computer system 900 using removable storage drive 914, hard drive 912, or communications interface 920. The control logic (software), when executed by the processor 904, causes the processor 904 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 10:
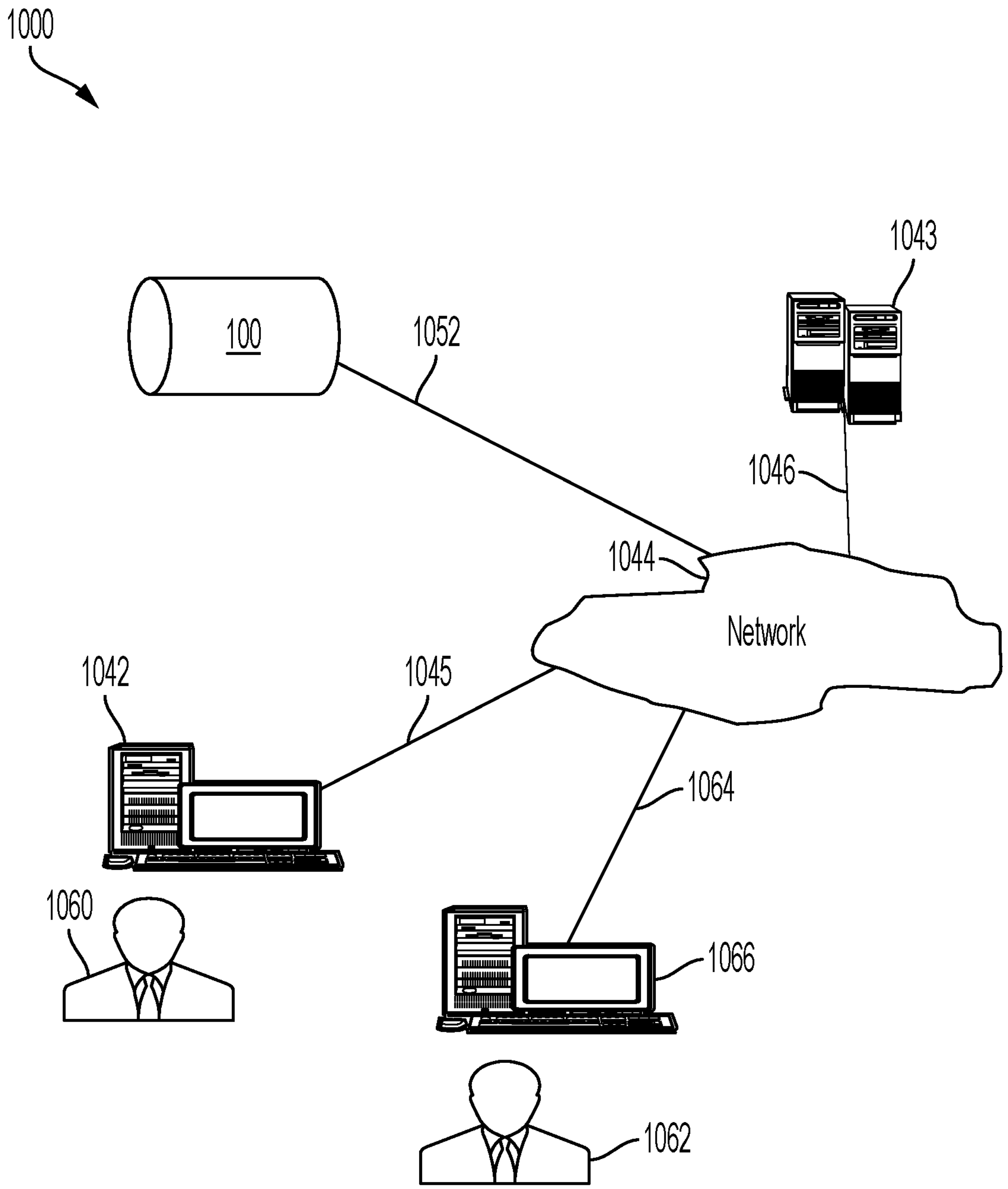
FIG. 10 illustrates a block diagram of various exemplary system components, in accordance with aspects of the present disclosure.

FIG. 10 illustrates a block diagram of various example system components for use with implementations in accordance with an aspect of the present disclosure. FIG. 10 shows a communication system 1000 usable in accordance with aspects of the present disclosure. The communication system 1000 includes one or more accessors 1060, 1062 (also referred to interchangeably herein as one or more "users") and one or more terminals 1042, 1066. In one aspect, data for use in accordance with aspects of the present disclosure may for example, be input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another example variation, the method and system in accordance with aspects of the present disclosure operate in a stand-alone environment, such as on a single terminal. In some aspects, the eCRA system 100 may be connected to the network 1044 via a coupling 1052. The data from the eCRA system 100 may be accessed via the network 1044 by, for example, the terminals 1042, 1066. The eCRA system 100 may also access data from, for example, the server 1043 via the network 1044.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Also, it will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A device, comprising:

an electron source configured to provide a beam of electrons; and an accelerator including:

a radio frequency (RF) cavity having a longitudinal axis, one or more inlets, and one or more outlets;

a first electro-magnet substantially surrounding at least a portion of the RF cavity and configured to produce an axial magnetic field, wherein the RF cavity is coupled to an RF source, and wherein the RF source applies an RF wave configured to accelerate the beam of electrons axially entering the RF cavity with non-linear cyclotron resonance acceleration; and a second electro-magnet located downstream of the one or more outlets of the RF cavity and configured to generate an inverse cusp in the axial magnetic field.

2. The device of claim 1, wherein a current in a second set of coils of the second electro-magnet is in an opposite direction of a first set of coils of the first electro-magnet.

3. The device of claim 1, wherein the inverse cusp provides a transverse impulse to the beam of electrons that transforms transverse momentum of the electrons into axial momentum.

4. The device of claim 1, wherein the beam of electrons exiting the second electro-magnet is an annular beam of substantially linearly-directed electrons.

5. The device of claim 1, further comprising a target located downstream from the second electro-magnet.

6. The device of claim 1, wherein the RF wave is a superposition of two orthogonal $TE_{111}$ transverse electric modes excited in quadrature to produce an azimuthally rotating standing-wave mode configured to accelerate the beam of electrons axially entering the RF cavity with the non-linear cyclotron resonance acceleration.

7. The device of claim 5, wherein the target is a heavy metal configured to absorb the beam of electrons and generate a forward-directed beam of energetic x-rays.

8. The device of claim 5, wherein the target is a window that separates a vacuum of the RF cavity from an atmosphere.

9. A method, comprising:
- receiving, at an RF cavity within a first axial magnetic field, a beam of electrons via one or more inlets;
- applying a radio frequency (RF) wave to the RF cavity, wherein the RF wave is configured to accelerate the beam of electrons axially entering the RF cavity with non-linear cyclotron resonance acceleration;
- emitting the accelerated beam of electrons from the RF cavity via one or more outlets; and
- manipulating the beam of electrons leaving the RF cavity from a helical orbit to a substantially linear path with a second axial magnetic field.

10. The method of claim 9, wherein manipulating the beam of electrons leaving the RF cavity comprises applying a current in a second set of coils of a second electro-magnet in an opposite direction of a first set of coils of a first electro-magnet that generates the first axial magnetic field.

11. The method of claim 9, wherein manipulating the beam of electrons leaving the RF cavity comprises generating an inverse magnetic cusp with the second axial magnetic field, wherein the inverse magnetic cusp provides a transverse impulse to the beam of electrons that transforms transverse momentum of the electrons into axial momentum.

12. The method of claim 9, further comprising directing the beam of electrons toward a target.

13. The method of claim 9, further comprising directing the accelerated beam of electrons toward a waste stream to be irradiated.

14. The method of claim 9, wherein the RF wave is a superposition of two orthogonal $TE_{111}$ transverse electric modes excited in quadrature to produce an azimuthally rotating standing-wave mode configured to accelerate the beam of electrons axially entering the RF cavity with the non-linear cyclotron resonance acceleration.

15. The method of claim 10, wherein the beam of electrons exiting the second electro-magnet is an annular beam of substantially linearly-directed electrons.

16. The method of claim 12, wherein the target is a heavy metal configured to absorb the beam of electrons and generate a forward-directed beam of energetic x-rays.

17. The method of claim 16, wherein the x-rays are directed to one of: a medical device, food, or insect to be sterilized; an electronic or industrial weld or nuclear material to be inspected; or a well to be measured.

18. A device, comprising:
- an electron source configured to provide a beam of electrons; and
- an accelerator including:
  - a radio frequency (RF) cavity having a longitudinal axis, one or more inlets, and one or more outlets;
  - an electro-magnet substantially surrounding at least a portion of the RF cavity and configured to produce an axial magnetic field;
  - at least one pair of waveguides coupling the RF cavity to an RF source configured to generate an RF wave, wherein the RF wave is a superposition of two orthogonal $TE_{111}$ transverse electric modes excited in quadrature to produce an azimuthally rotating standing-wave mode configured to accelerate the beam of electrons axially entering the RF cavity with non-linear cyclotron resonance acceleration; and
  - means for manipulating the beam of electrons leaving the RF cavity from a helical orbit to an axial and substantially linear path.

19. The device of claim 18, wherein the means for manipulating the beam of electrons leaving the RF cavity from the helical orbit to the axial and substantially linear path includes a second electro-magnet positioned to generate an inverse magnetic cusp that provides a transverse impulse to beam electrons.

20. The device of claim 19, wherein the means for manipulating the beam of electrons includes a target.

* * * * *